United States Patent Office 3,235,627
Patented Feb. 15, 1966

3,235,627
ALKALI SOLUBLE AND ALKALI STABLE COMPOSITIONS COMPRISED PREDOMINANTLY OF PHOSPHATE MONOESTERS
Richard C. Mansfield, Cherry Hill, N.J., assignor to Rohm & Haas Company, Philadelphia, Pa., a corporation of Delaware
No Drawing. Filed Jan. 31, 1963, Ser. No. 255,173
13 Claims. (Cl. 260—926)

This application is a continuation-in-part of my U.S. application Serial No. 195,952 which was filed on May 18, 1962, and which has since been abandoned.

This invention relates to the production of surface-active compositions and, more particularly, to the production of surface-active compositions containing essentially primary phosphate esters of hydroxylic organic compounds.

The phosphorylation of organic compounds containing hydroxylic groups, using such phosphorylating agents as $P_2O_5$, $PCl_3$, $POCl_3$, $PCl_5$, polyphosphoric acid, etc., has been known.

The phosphorylation of non-ionic surface-active agents, such as ethylene oxide adducts of alkylphenols and aliphatic alcohols with some 0.22 to 0.5 mole of $P_2O_5$, has been described in U.S. Patents 3,004,056 and 3,004,057. The use of phosphorylated ethylene oxide adducts of alkylphenols and aliphatic alcohols as emulsifiers in emulsion polymerization has been described in U.S. Patent 2,853,471. In the latter case, the phosphates were prepared with the aid of a polphosphoric acid, using an excess of the non-ionic compound. This led to the formation of secondary phosphates and probably to incomplete termination (i.e., phosphorylation).

Phosphate esters of polymeric non-ionic surfactants have also been prepared, using $P_2O_5$, as shown in U.S. Patent 2,454,542. In that case, the ratio of $OH/P_2O_5$ is equal to 2:1.

Broadly stated, the object of the present invention is to provide complex surface-active agents which are phosphorylated ethylene oxide adducts of organic compounds such as alkylphenols, aliphatic alcohols, t-alkyl primary amines, etc.

Another object is to provide a process for preparing these new compositions which avoids the processing difficulties involved in the use of $P_2O_5$ as the phosphorylating agent and which permits preparation of these compositions without contamination of hydrogen chloride or chlorine-containing impurities.

A more specific object is to provide phosphorylated adducts of hydroxylic organic compounds in which the primary phosphate esters comprise from not less than about 85% to about 100 of the surface-active materials in the product.

The attainment of the above objects is made possible by the process of this invention which broadly consists in the reaction of a non-ionic surface-active agent with a molar excess of polyphosphoric acid. Some of the non-ionic surface-active agents which have been employed, and which are preferred in the practice of the present invention, are shown in Table I which follows:

TABLE I (A)       $R^1$
          |
          R—N—$R^2$ where $R = C_8H_{17}$ to $C_{14}H_{29}$,
$R^1 = (—CH_2—CH_2O)_xH$, and
$R^2 = H$, $C_8H_{17}$ or $(—CH_2—CH_2O)_yH$ in which $x$ is any number in the range between 5 and 50, inclusive, and $y$ is any number in the range between 5 and 50, inclusive, provided that the sum of $x$ and $y$ is any number in the range between 5 to 50, inclusive.

(B) 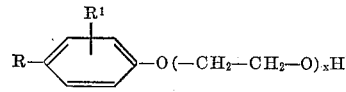

where $R = H$ or an alkyl group in the range of $CH_3$ to $C_{12}H_{25}$,
$R^1 = H$ or an alkyl group in the range of $CH_3$ to $C_9H_{19}$, and
$x$ is at least 1 and preferably is no more than 30.

(C)     R—O—$(CH_2—CH_2—O)_xH$ where $R = C_{12}H_{23}$ or $C_8H_{17}$—$C_{18}H_{37}$ and
$x$ is at least 1 and preferably is no more than 25.

Numerous other non-ionic surface-active agents may also be employed in this invention. As pointed out in U.S. Patent 3,004,056, those non-ionics are well known in the art and are disclosed along with suitable methods for their preparation in numerous patents and publications. In general, they may be obtained by condensing a polyglycol ether containing the required number of alkenoxy groups or an alkylene oxide such as propylene oxide, butylene oxide, or preferably ethylene oxide, with an organic compound containing a reactive hydrogen atom. As such compounds containing a reactive hydrogen atom, there may be mentioned alcohols, phenols, thiols, primary and secondary amines and carboxylic and sulfonic acids and their amides. The amount of alkylene oxide or equivalent condensed with the reactive hydrogen-containing compound, i.e., the length of the polyoxyalkylene chain, will depend primarily upon the particular compound with which it is condensed. As a convenient rule of thumb, an amount of alkylene oxide or equivalent should be employed which will result in a condensation product containing about 20 to 85% by weight of combined alkylene oxide. However, the optimum amount of alkylene oxide for attainment of the desired hydrophobic-hydrophilic balance may be readily determined in any particular case by preliminary test and routine experimentation.

A preferred group of non-ionic surface-active agents useful as reactants in the present invention comprises those derived from phenol or alkyl phenolic compounds. Numerous compounds of the latter type, i.e., polyalkylene oxide derivatives of phenolic compounds containing one or more alkyl substituents, are described in U.S. Patents 2,213,477 and 2,593,112. Those preferred are the polyalkylene oxide derivatives of alkyl phenolic compounds in which the total number of alkyl carbon atoms is between 4 and 20. As examples of such phenolic compounds, there may be mentioned normal and isomeric butyl, amyl, dibutyl, and diamyl phenols and cresols, tripropyl phenols and cresols, heptyl, octyl, nonyl, decyl, undecyl, dodecyl, tetradecyl, cetyl, oleyl, octadecyl, and the like, phenols and cresols in addition to dihexyl- and trihexylphenol prepared from hexene-1 and phenol, diisoheptyl-phenol, dioctyl-phenol, dinonyl-phenol, dioctyl-p-cresol, dioctyl-o-cresol, didecyl-phenol, didecyl-p-cresol, didodecyl-phenol, and the like. Of particular value are the polyalkylene oxide derivatives of secondary and tertiary alkyl-substituted phenols and cresols obtained by condensing olefins of the type obtained in petroleum refining with phenols or cresols. In the case of products obtained by condensing phenol or cresol with olefins of from 3 to 5 carbon atoms, such as propylene, butylene or amylene, it is sometimes desirable to employ the dialkylated phenols or cresols, while, in the case of compounds obtained by condensing a phenol or cresol with an olefin containing 8 or more carbon atoms, the monosubstituted derivatives are sometimes preferred. Particularly desirable derivatives can be obtained from the phenols and cresols containing a substituent derived from olefins containing from 8 to 18 carbon atoms, such as diisobutylene and other alkylenes as nonylene, decylene, undecylene, dodecylene, pentadecylene, octadecylene and mixtures thereof, and may advantageously be the dimers and trimers obtained by polymerization of such low molecular weight olefins as propylene, butylene, isobutylene, amylene or mixtures thereof.

However, the polyalkylene oxide derivatives of other organic compounds containing an active hydrogen may be employed as reactants in the present invention. Thus, the polyalkylene oxide derivatives, described in U.S. Patent 1,970,578, of aliphatic organic hydroxy compounds may be employed if desired. As examples of water-insoluble higher fatty acids whose polyalkylene oxide derivatives may be employed, there may be mentioned lauric, oleic, ricinoleic, palmitic and stearic acids, and the like, or mixtures thereof, such as the mixtures obtained from animal and vegetable fats and oils or by the oxidation of such petroleum fractions as paraffin wax. As another preferred group, there may also be employed polyalkylene oxide derivatives of water-insoluble aliphatic hydroxy compounds such as higher aliphatic alcohols of at least 10 carbon atoms, i.e., the alcohols corresponding to the fatty acids specified immediately above, particularly the alcohols obtainable by hydrogenation of the fatty acids or glycerides present in animal or vegetable oils and waxes such as coconut oil, castor oil, and the like, as well as the polyalkylene oxide derivatives of the animal and vegetable oils, fats and waxes themselves. There may also be used polyalkylene oxide derivatives of organic mercapto compounds such as the products described in U.S. Patent 2,205,021, i.e., the polyalkylene oxide derivatives of such mercapto compounds as dedecyl mercaptan, oleyl mercaptan, cetyl mercaptan, decyl mercaptan and thiophenols, thionaphthols, benzomercaptan, etc.; also, the polyalkylene oxide derivatives of carboxylic acid amides such as those described in U.S. Patent 2,085,706, and of sulfonamides of the type described in U.S. Patent 2,002,613, or the polyalkylene oxide derivatives, described in U.S. Patent 2,266,141, or sulfonic acids may be employed if desired. Similarly, the surface-active polyalkylene oxide derivatives disclosed in U.S. Patent 2,677,700 may also be employed in the instant invention.

Another group of non-ionic surface-active agents which may be employed as reactants herein comprises those of the Pluronic type as disclosed, for example, in U.S. Patent 2,674,619 and other patents. In general, in preparing these agents a suitable 1,2-alkylene oxide or substituted alkylene oxide, as, for example, butylene oxide, amylene oxide, phenyl ethylene oxide (styrene oxide), cyclohexene oxide, cyclooctene oxide, or preferably propylene oxide, or a mixture thereof, is polymerized in the presence of an alkaline catalyst such as sodium hydroxide, preferably at elevated temperatures and pressures, to produce the corresponding water-insoluble polypropylene glycol or substituted polypropylene glycol having a molecular weight of about 300 to 3000. Said polyglycol is then reacted under similar conditions with the required number of moles of ethylene oxide to yield the desired non-ionic surface-active agents employed herein. These agents should generally have a molecular weight ranging from about 1200 to 15,000 and preferably about 2000 to 10,000. Alternatively, ethylene diamine, propylene diamine, other alkylene diamines and polyalkylene polyamines, in addition to ethylene glycol, propylene glycol, 1,4-butanediol, hexamethylene glycol and other diols, may be reacted with the required number of moles of propylene oxide or substituted propylene oxide to produce the corresponding water-insoluble polypropylene glycols and substituted polypropylene glycols having a molecular weight of about 300 to 3000 as described above, followed by reaction with the required number of moles of ethylene oxide. It will be understood that these Pluronic types of non-ionic surface-active agents will ordinarily be of the diol type containing two terminal hydroxy (ethanol) groups. One of these terminal hydroxy groups may be blocked by reaction with an etherifying agent, esterifying agent, or the like prior to phosphation in accordance with the process of this invention. However, if not so blocked or protected, it is necessary to increase the amount of polyphosphoric acid up to double the amount in order to maintain a molar excess over the hydroxyl groups present.

Another preferred group of non-ionic surface-active agents useful as reactants in the present invention comprises the condensation products of at least one mole of ethylene oxide with one mole of a multi-branched chain primary aliphatic alcohol having the molecular configuration of an alcohol produced by the Oxo process from a polyolefin of at least 7 carbon atoms. Such alcohols are prepared by the catalytic reaction of a polyolefin such as tripropylene, tetrapropylene, pentapropylene, diisobutylene, triisobutylene, etraisobutylene, propylene-isobutylene and tributene and the like with carbon monoxide and hydrogen to form an aldehyde followed by catalytic reduction of this aldehyde to a primary alcohol. This two-stage process is well known as the Oxo process and alcohols produced by such process may be designated as "Oxo alcohols." A particularly preferred alcohol of this type is the Oxo tridecyl alcohol produced from tetrapropylene or triisobutylene. These alcohols are reacted with the required number of moles or ethylene oxide to produce non-ionic surface-active agents effective as retactants herein.

The following is an illustrative, non-limitative list of some specific examples of suitable non-ionic surface-active agents which may be employed as reactants in the present invention. In this list, "E.O." means "ethylene oxide" and the number preceding same refers to the number of moles thereof reacted with one mole of the non-ionic surface active precursor, i.e., the given reactive hydrogen-containing compound.

Nonylphenol+9–11 E.O.
Nonylphenol+2 E.O.
Dinonylphenol+7 E.O.
Dodecylphenol+18 E.O.
Castor oil+20 E.O.
Tall oil+18 E.O.
Oleyl alcohol+20 E.O.
Lauryl alcohol+4 E.O.
Lauryl alcohol+15 E.O.
Hexadecyl alcohol+12 E.O.
Hexadecyl alcohol+20 E.O.
Octadecyl alcohol+20 E.O.
Oxo tridecyl alcohol:
　　(from tetrapropylene)+7 E.O.
　　(from tetrapropylene)+10 E.O.
　　(from tetrapropylene)+15 E.O.
Dodecyl mercaptan+9 E.O.
Soya bean oil amine+10 E.O.
Rosin amine+32 E.O.
Cocoanut fatty acid amine+7 E.O.
Cocoa fatty acid+10 E.O.
Dodecylbenzene sulfonamide+10 E.O.
Decyl sulfonamide+6 E.O.
Oleic acid+5 E.O.
　Polypropylene glycol (30 oxypropylene units)+10 E.O.

The polyphosphoric acid which is used in the practice of the present invention is a commercially available or other complex mixture of acids with a phosphoric acid anhydride content corresponding to about 73 to 85 percent, expressed as percent $P_2O_5$. A preferred phosphoric acid anhydride content, expressed as percent $P_2O_5$, is 82 to 84 percent. A detailed description thereof can be found in "Advance in Organic Chemistry: Methods and Results," volume I, pages 35–76, Interscience Publishers Incorporated, New York (1960).

The amount of polyphosphoric acid which should be used for each equivalent of hydroxyl group in the non-ionic surface-active agent is about 0.6 to about 2.0 moles when the preferred concentration of polyphosphoric acid is used. The preferred amount of polyphosphoric acid which should be used for each equivalent of hydroxyl groups in the non-ionic surface-active agent is dependent upon the number of moles of condensed ethylene oxide in the non-ionic surface active agent when the preferred concentration is used. By way of explanation, the moles of polyphosphoric acid can be calculated as follows:

$$1 \text{ gram mole} = \frac{142}{0.82-0.84} = 169-173 \text{ grams}$$

This calculation is obviously applied to polyphosphoric acid with a phosphoric acid anhydride content expressed as $P_2O_5$, corresponding to 82–84 percent. This type of calculation may be applied to other concentrations of polyphosphoric acid.

In almost all cases if less than about 1 mole of polyphosphoric acid for each hydroxyl equivalent is used, incomplete phosphation results and there will remain in the final product some unreacted non-ionic surfactant. As a result, the product will not be sufficiently soluble in alkali and will tend to discolor when in contact with alkali. An exception to this general rule occurs when the value for $x$ in the formulas given in Table I above is near the lower end of the stated ranges, in which case slightly lower mole ratios can be used. In the compounds expressed by Formula B in Table I, for example, when $x$ is 2 or less as little as 0.6 mole of polyphosphoric acid can be used per mole of hydroxyl equivalent. Conversely, it should be noted, when $x$ is near the upper end of the range, more polyphosphoric acid, even as much as about 2 moles, could be required.

The optimum ratio in most cases will be from about 1.0 to about 1.3 moles of polyphosphoric acid to hydroxyl equivalent, for it permits the reaction to go to completion within a reasonable time (2–6 hours) and at moderate temperature to give products that are highly phosphated and, therefore, highly soluble in caustic solutions. Greater amounts of polyphosphoric acid shorten the reaction time.

The reactions are best carried out by gradually adding the polyphosphoric acid to the non-ionic surface-active agent (i.e., the condensation product of ethylene oxide and the non-ionic surface-active agent precursor), while stirring, at ambient or moderately elevated temperatures, then heating at about 80–110° C. until the reaction is complete. This is evidenced by the fact that the cloud point measured in dilute sodium hydroxide solution will no longer rise when the reaction is complete. Optionally, small amounts of hydrogen peroxide can be added to the non-ionic surfactant prior to mixing it with the polyphosphoric acid. This results in lighter colored products. Reversing the indicated order of addition can cause an objectionable darkening of the end product. The products may be used as such or as salts by reacting them with suitable bases.

An additional option, instead of using an oxidizing agent, is to use a reducing agent such as hydrazine hydrate.

When hydrogen peroxide is used as the color preventing agent, the color of the product ranges from 5 (or less in some cases) to >18 on the VCS scale, depending on the amount of $H_2O_2$ used. (This refers to the varnish color scale, Gardner scale, standards of 1933.) By using hydrazine at the same concentration, the product colors are considerably lower, as is demonstrated by the data in Table II which follows:

TABLE II

| Lot No. | Wt. Percent $N_2H_4 \cdot H_2O$ | Wt. Percent $H_2O_2$ | Final VCS Color |
|---|---|---|---|
| 1 | 0.06 | none | 11+ |
| 1 | 0.1 | none | 8 |
| 1 | 0.2 | none | 8– |
| 1 | none | none | ⟩⟩⟩18 |
| 1 | none | 0.06 | ⟩⟩18 |
| 1 | none | 0.25 | 12– |
| 1 | none | 0.40 | 16– |
| 2 | 0.1 | none | 7 |
| 2 | 0.2 | none | 6 |
| 2 | none | none | ⟩⟩18 |
| 2 | none | 0.06 | ⟩18 |

The advantages of the present invention over the prior art are as follows: Processes for phosphorylating hydroxylic organic compounds with halogen-containing phosphorylating agents are undesirable since the products contain bound chlorine atoms and hydrogen chloride is produced during the reaction. This necessitates glass-lined equipment in order to avoid corrosion of steel. Additionally, the hydrogen chloride must be removed from the product in order that the product itself should not be corrosive in nature.

Processes for phosphorylating hydroxylic organic compounds with $P_2O_5$ suffer from the fact that $P_2O_5$ is extremely hygroscopic and, therefore, is difficult to handle. In addition, $P_2O_5$ tends to be insoluble in the reaction mixture, thereby forming undesirable lumps or aggregates therein.

Another drawback in the use of $P_2O_5$, at least as described in U.S. Patents 3,004,056 and 3,004,057, is the fact that the process is carried out under substantially anhydrous conditions using from 2–4.5 moles of non-ionic surface-active agents for each mole of $P_2O_5$. In other words, molar excesses of non-ionic surface-active agents are required to solubilize the $P_2O_5$. In the process of the present invention, excesses of non-ionic surface-active agents are not required for complete miscibility of the reactants under the reaction conditions employed, and, therefore, it is possible to prepare phosphorylated surfactants, essentially free from non-ionic surface-active compounds, which are stable and do not discolor on alkali.

If phosphoric acid is used instead of polyphosphoric acid, in an attempt to phosphorylate non-ionic surface-active agents, under the conditions described herein, very little, if any, phosphorylation occurs, and the change which does take place is incomplete.

Polyphosphoric acid is used to phosphorylate non-ionic compounds in U.S. Patent 2,853,471. However, the ratios used are 2–3 moles of the non-ionic compound to 1 mole of the phosphorylating agent. The result of using excesses of the non-ionic as described in that patent is the formation of a product which consists principally of secondary phosphates and is, therefore, less soluble in alkaline solutions than is a product which consists principally of primary phosphates. Some unreacted non-ionic compounds also remain, and these tend to lower the solubility in alkaline solutions and cause discoloration on solid alkali.

As stated above, the surface-active agents in the product of the present invention contain upwards of 85% primary phosphate esters. This tends to make the novel products much more useful than compositions having present lesser amounts of the primary and more of the secondary phosphated esters. The higher amount of the primary phosphated ester makes the compositions more satisfactory as hydrotropes, more soluble in alkaline solutions and increases their stability on solid caustic. Another valuable feature of the present products is their high degree of phosphation, this being important in alkaline cleaning compositions since the presence of unterminated non-ionic surface-active agents causes discoloration when the product comes in contact with solid caustic. Still another important feature of the present invention is that the novel compounds have greater solubility in alkali than do products made from the same substrate with a phosphorylating agent other than the molar excess of polyphosphoric acid. These features are illustrated in Tables III–VII which follow:

TABLE III

[Substrate used: commercially available mixture consisting principally of ethylene oxide adducts of t-$C_{11}H_{23}NH_2$ to t-$C_{14}H_{29}NH_2$ containing an average of 15 units of ethylene oxide]

| Phosphorylating Agent | Moles Non-Ionic/Mole Phosphorylating Agent | Max. NaOH Conc. for Complete Solubility of 1% Product at 100° C. |
|---|---|---|
| $POCl_3$ | 0.125 | 16.1 |
| $POCl_3$ | 0.5 | 16.0 |
| $P_2O_5$ | 1.43 | 4 |
| $P_2O_5$ | 0.91 | 13 |
| Polyphosphoric acid | 0.5 | 21 |

TABLE IV

[Substrate used: octylphenoxypolyethoxyethanol with an average of 7.5 units of ethylene oxide (or $OPE_{7.5}$)]

| Phosphorylating Agent | Moles Non-Ionic/Mole Phosphorylating Agent | Discoloration* |
|---|---|---|
| Polyphosphoric Acid | 0.5 | Much. |
| Do | 0.9 | Slight. |
| Do | 1.1 | None. |

5% of surfactant on granulated NaOH was allowed to stand in sealed jars for 1 week at 25° C.

TABLE V

| Moles Polyphosphoric Acid Per Mole $OPE_{7.5}$ | Solubility (1% Surfactant) | |
|---|---|---|
| | In 10% NaOH | In 16% NaOH |
| 0.4 | Insoluble | Insoluble. |
| 0.5 | Soluble 0–59° C | Insoluble. |
| 0.76 | Soluble 0–100° C | Soluble 0–53° C. |
| 1.125 | Soluble 0–100° C | Soluble 0–100° C. |

TABLE VI

Moles polyphosphoric acid per mole $OPE_{12.5}$:     Percent $OPE_{12.5}$ is phosphorylated
0.5 _____ 56.3
1.0 _____ 96.3

TABLE VII

Moles polyphosphoric acid per mole phenoxyethanol:     Percent phenoxyethanol is phosphorylated
0.5 _____ 72.6
0.6 _____ 86.1
0.7 _____ 96.3

*Example I*

To a stirred mixture of 312 parts (0.500 m.) of "Triton X–100" (an ethylene oxide adduct of p-t-octylphenol having a hydroxyl number of 89.9, which corresponds to an equivalent weight of 624) and 0.55 part of 30% $H_2O_2$ in a nitrogen atmosphere was added 111 parts (0.657 m.) of Victor 115% ortho equivalent (82–84% $P_2O_5$) polyphosphoric acid during ½ hour while the temperature rose to 50° C. The mixture was then heated to 105° C. during another 1½ hours and stirred at 105–110° C. for 1½ hours. The reaction was complete, as evidenced by no further change in cloud point (73° C./18% NaOH) during another ½ hour. The product was cooled and bottled and had a VCS color of 5.

*Example II*

A mixture of 170.2 parts (0.20 m.) of the product from the addition of 15 moles of ethylene oxide to a $C_{11}$–$C_{14}$ t-alkyl primary amine and 53.0 parts (0.313 m.) of Victor 115% ortho equivalent polyphosphoric acid was stirred at 100–105° C. for 5 hours. The mixture was cooled and bottled. It was soluble to the boil in 15.4% aqueous sodium hydroxide solution. A similar preparation, using 0.20 m. of polyphosphoric acid for 0.10 m. of the same non-ionic with a longer heating period, was soluble to the boil in 21% aqueous sodium hydroxide.

*Example III*

A stirred mixture of 91.7 parts (0.10 m.) of the adduct of 14.9 moles of ethylene oxide to a mixture of stearyl and cetyl alcohols and 20.3 parts (0.12 m.) of Victor 115% ortho equivalent polyphosphoric acid was heated to 95° C. during ½ hour. The cloud point was then 88° C. in 11% aqueous sodium hydroxide. The mixture was then cooled to room temperature during ½ hour. Because of the fact that the mixture was heated for only one-half hour, the reaction had not gone to completion and the product, therefore, was not so soluble as it would have been if it had been allowed to go to completion. A similar preparation employing 1.5 moles of polyphosphoric acid for each mole of a non-ionic surfactant similar to that described above, but containing only 7.45 moles of ethylene oxide with longer heating, gave a product which was soluble to the boil in 15% sodium hydroxide solution.

The products of this invention may be supplied in free, unneutralized form or in the form of the partially or completely neutralized salts containing as cations alkali metals, alkaline earth metals, metals, ammonium and organic amines. Use in the form of such salts is in some instances preferred or necessary, as, for example, when employed in alkaline surface-active and other compositions. It is to be understood that such salts are to be regarded as the equivalent of the present products in their free form. As examples of suitable cations, there may be mentioned sodium, potassium, lithium, calcium, strontium, barium, magnesium, iron, tin, cadmium, aluminum, antimony, chromium, manganese, mercury, nickel, silver, zinc, ammonium, and aliphatic, alicyclic, aromatic and heterocyclic organic amines such as the mono-, di- and trimethylamines, ethylamines, propylamines, laurylamines, stearylamines, ethanolamines, propanolamines, butanolamines, hexanolamines, cyclohexylamines, phenylamines, pyridylamines, morpholinylamines, and the like.

The compositions herein described are useful as surface-active agents, as non-durable anti-static agents on Dacron, Orlon and acetate, as emulsifiers for emulsion polymerization, and as stable, non-discoloring, alkali-soluble surfactants. Another important use is as a hydrotope for solubilizing non-ionic surfactants in built alkaline solutions. This last use is more fully described and claimed in U.S. application Serial No. 195,967, in the hands of a common assignee filed May 18, 1962, in the names of Dupre and Fordyce and entitled, "Phosphorylated Surfactants as Hydrotropes." It will be apparent that other uses for the product will be available, such as the formulating thereof with soaps, suspending agents, brighteners, stabilizers, and the like, depending upon the particular application contemplated.

For the reason that numerous modifications and variations will become obvious to persons skilled in the art, it is to be understood that this invention should only be measured by the scope of the following claims rather than by the mere illustrations hereinabove given.

I claim:
1. A process for preparing surface active compositions containing essentially primary phosphate esters of hydroxylic organic compounds, comprising reacting polyphosphoric acid and a condensation product of at least about 1 mole of ethylene oxide with 1 mole of a nonionic surface-active agent precursor containing about 6 to 150 carbon atoms and a reactive hydrogen atom, at a temperature of between about 80° to 110° C., said polyphosphoric acid being a mixture of phosphoric acids with a phosphoric acid anhydride content corresponding to about 73 to 85 percent expressed as percent $P_2O_5$, and the ratio of the reactants being from about 0.6 mole to about 2 moles of polyphosphoric acid to 1 mole of said condensation product, provided that only when the number of condensed ethylene oxide units is no more than about 2 can there be employed as little as about 0.6 mole of polyphosphoric acid for each equivalent of hydroxyl groups in said condensation product, and further provided that the number of condensed ethylene oxide units can be as high as about 30 when there is employed as much as about 2 moles of polyphosphoric acid for each equivalent of hydroxyl groups in said condensation product.

2. A process as defined in claim 1 wherein said precursor is an alkyl phenol in which the total number of carbon atoms present in the alkyl groups ranges from 1 to about 21.

3. A process as defined in claim 1 wherein said precursor is a primary aliphatic alcohol of at least 8 carbon atoms.

4. A process as defined in claim 1 wherein said precursor is a tertiary alkyl primary amine having from 11 to 14 carbon atoms.

5. A process as defined in claim 1 wherein the reaction is carried out in the presence of a small amount of a compound selected from the group consisting of hydrogen peroxide and hydrazine hydrate which is added to said condensation product prior to the addition of the polyphosphoric acid.

6. The process of claim 5 in which the compound added to said condensation product is hydrogen peroxide.

7. The process of claim 5 in which the compound added to said condensation product is hydrazine hydrate.

8. A process comprising gradually adding to polyphosphoric acid a hydroxylic organic compound while stirring at ambient to moderately elevated temperatures and then heating at about 80 to 110° C. until the reaction is complete, the hydroxylic organic compound being a condensation product of at least about 1 mole of ethylene oxide with 1 mole of a non-ionic surface-active agent precursor containing about 6 to 150 carbon atoms and a reactive hydrogen atom, said polyphosphoric acid being a mixture of phosphoric acids with a phosphoric acid anhydride content corresponding to about 73 to 85 percent expressed as percent $P_2O_5$, and the ratio of the reactants being from about 0.6 mole to about 2 moles of polyphosphoric acid to 1 mole of said condensation product, provided that only when the number of condensed ethylene oxide units is no more than about 2 can there be employed as little as about 0.6 mole of polyphosphoric acid for each equivalent of hydroxyl groups in said condensation product, and further provided that the number of condensed ethylene oxide units can be as high as about 30 when there is employed as much as about 2 moles of polyphosphoric acid for each equivalent of hydroxyl groups in said condensation product.

9. A surface-active composition, produced by the process of claim 1, which contains upwards of 85% primary phosphate esters.

10. A surface-active composition, produced by the process of claim 2, which contains upwards of 85% primary phosphate esters.

11. A surface-active composition, produced by the process of claim 3, which contains upwards of 85% primary phosphate esters.

12. A surface-active composition, produced by the process of claim 4, which contains upwards of 85% primary phosphate esters.

13. A surface-active composition, produced by the process of claim 8, which contains upwards of 85% primary phosphate esters.

References Cited by the Examiner

UNITED STATES PATENTS

| | | | |
|---|---|---|---|
| 3,004,056 | 10/1961 | Nunn et al. | 260—461 |
| 3,004,057 | 10/1961 | Nunn | 260—461 |
| 3,010,903 | 11/1961 | Clarke et al. | 260—461 |
| 3,033,889 | 5/1962 | Chiddix et al. | 260—461 |
| 3,061,506 | 10/1962 | Nunn et al. | 260—461 |

CHARLES B. PARKER, *Primary Examiner.*